Figure 1:
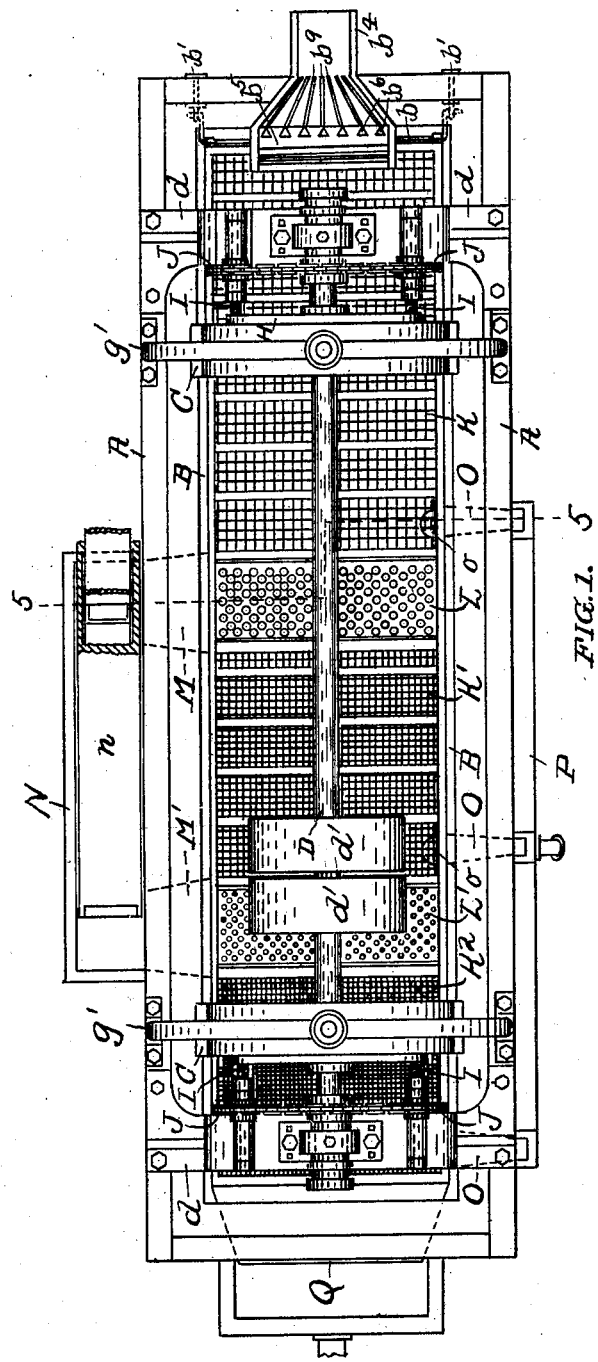

No. 887,922. PATENTED MAY 19, 1908.
G. T. COOLEY.
ORE CONCENTRATOR.
APPLICATION FILED NOV. 23, 1904.

3 SHEETS—SHEET 1.

Witnesses
W. H. Symmes
Agnes B. Grant

Inventor
George T. Cooley.
By Attorneys
Parkinson & Richards

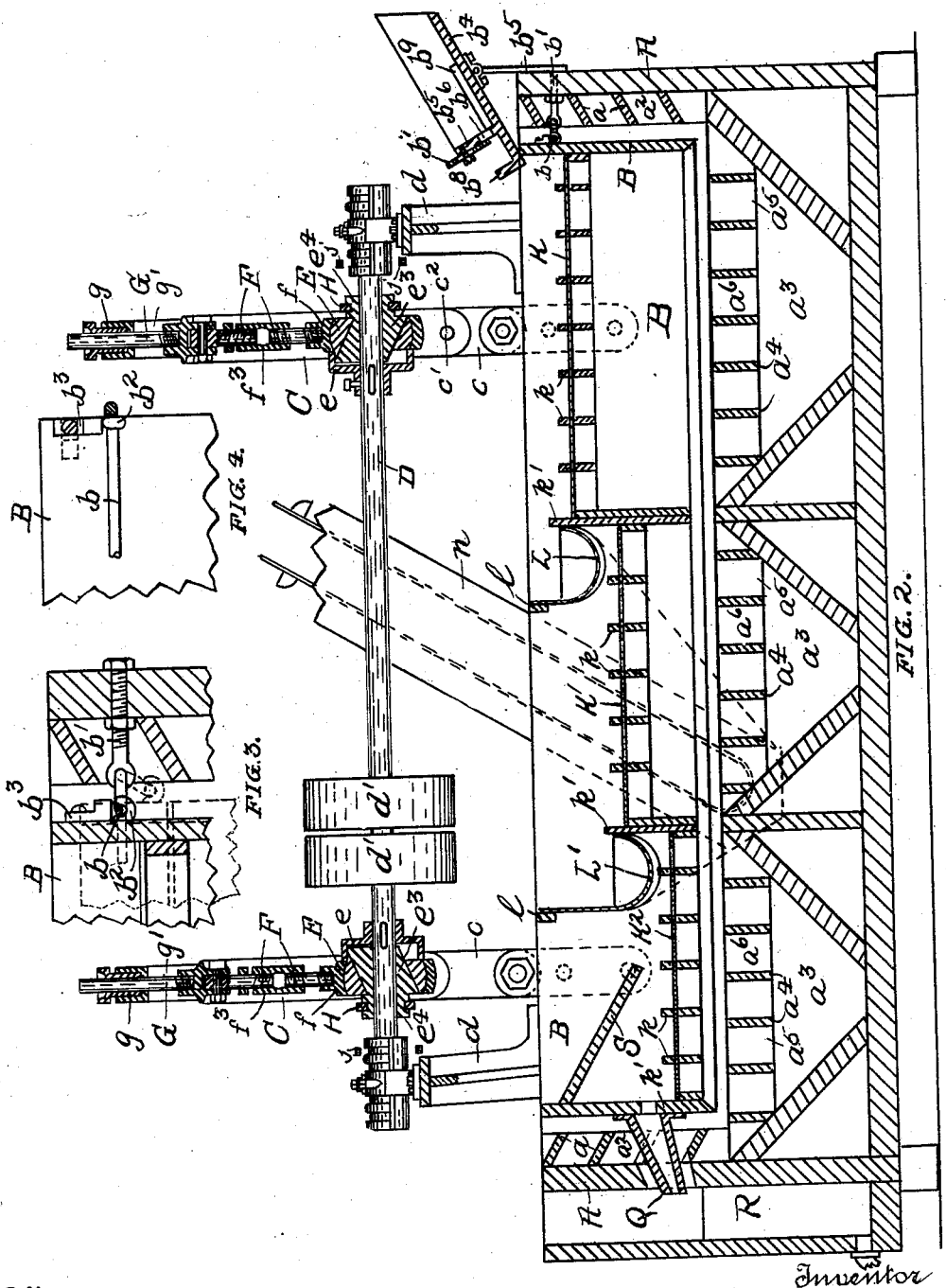

No. 887,922. PATENTED MAY 19, 1908.
G. T. COOLEY.
ORE CONCENTRATOR.
APPLICATION FILED NOV. 23, 1904.
3 SHEETS—SHEET 3.
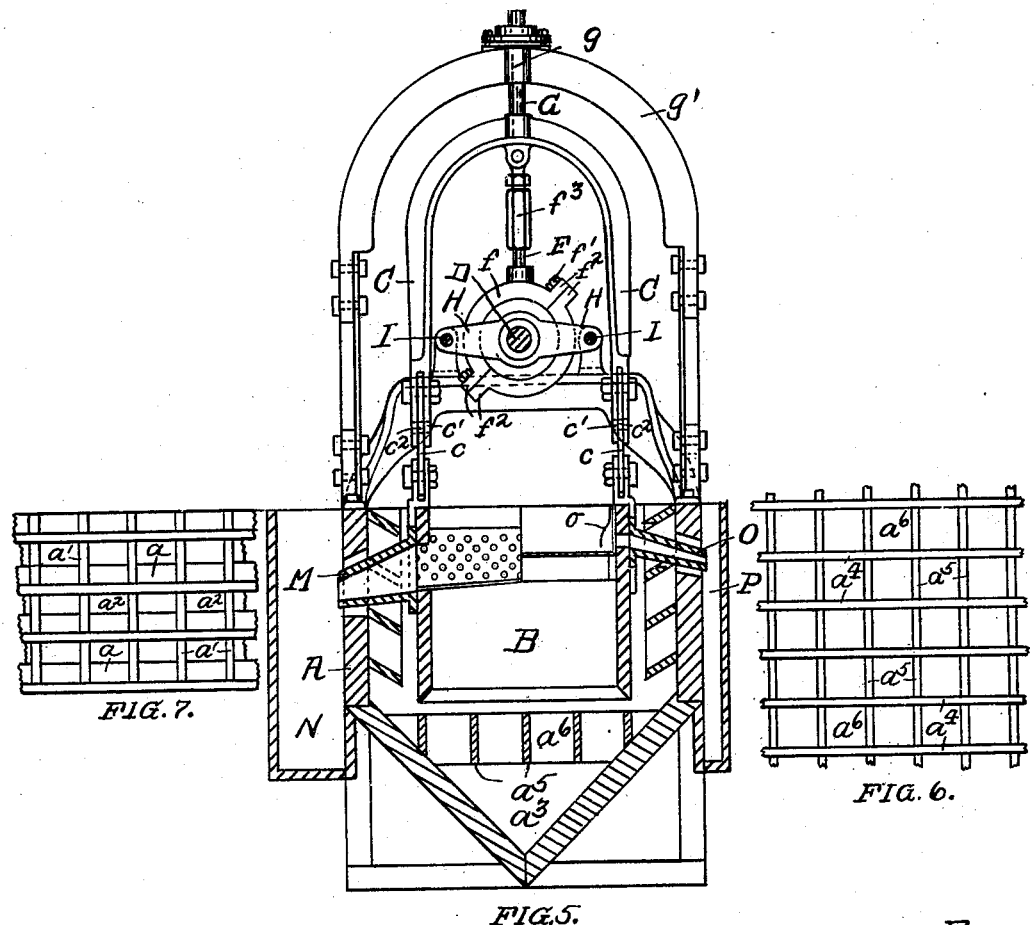
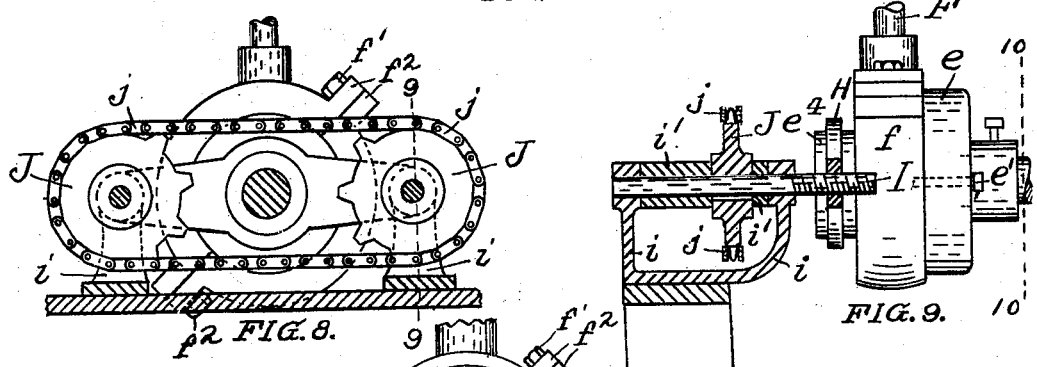

UNITED STATES PATENT OFFICE.

GEORGE T. COOLEY, OF JOPLIN, MISSOURI.

ORE-CONCENTRATOR.

No. 887,922.   Specification of Letters Patent.   Patented May 19, 1908.

Application filed November 23, 1904. Serial No. 234,002.

*To all whom it may concern:*

Be it known that I, GEORGE T. COOLEY, a citizen of the United States, residing at Joplin, in the county of Jasper and State of Missouri, have invented certain new and useful Improvements in Ore-Concentrators, of which the following is a specification.

The object of my invention is to provide improved apparatus for concentrating ores and my invention consists in the combination and arrangement of parts hereinafter described and claimed.

In the drawings Figure 1 is a top plan view of an ore concentrator embodying my invention; Fig. 2, a longitudinal section of Fig. 1; Fig. 3, an enlarged section through one end of the concentrating frame; Fig. 4, a partial end view corresponding to Fig. 3; Fig. 5, a section on line 5—5 of Fig. 1; Fig. 6, a partial plan view of the cellular partition in the tank; Fig. 7, a partial elevation of the sides of the tank; Fig. 8, an enlarged view of the means for adjusting the operative stroke of the apparatus; Fig. 9, a section on line 9—9 of Fig. 8, and Fig. 10, a section on line 10—10 of Fig. 9.

Reference letter A represents a tank adapted to contain water; B a concentrating frame suspended in tank A on hangers C; D an operative shaft; E eccentrics mounted on shaft D; F link rods connecting eccentrics E with hangers C; G guide rods for hangers C; H cross-heads for adjusting the throw of eccentrics E; I screw threaded shafts for operating cross-heads H; J sprocket wheels for operating shafts I; K, K' and $K^2$ concentrating sieves mounted in frame B; L and L' sizers for receiving the tailings from sieves K and K'; M and M' discharge spouts for sizers L and L'; N a discharge compartment for spouts M and M'; O ore discharge spouts for sieves K, K' and $K^2$; P, a discharge compartment for spouts O; Q, a discharge spout for the tailings from sieve $K^2$; R, a discharge compartment for spout Q; and S, a deflecting board set over the end of sieve $K^2$.

The tank A may be of any desired form of construction adapted to contain water and frame B is of a size to movably hang therein. Around the sides of tank A are placed inclined boards $a$ with vertical partitions $a'$ which divide the interior vertical walls of the tank into partitions or pockets $a^2$. The bottom of the tank is divided into hoppers $a^3$ placed under each of the sieves K, K' and $K^2$ and across the tops of these hoppers are placed vertical boards $a^4$ with vertical partitions $a^5$ forming divisions $a^6$. The hoppers $a^3$ may be provided with any of the usual means (not shown) for drawing off ore collecting therein.

The concentrating frame B is hung on hangers C which are pivotally attached thereto by means of links $c$. At one end frame B is pivotally connected with the end of tank A preferably by means of a bail $b$ which is pivoted in eye-bolts $b'$ and engages hooks $b^2$ on the end of the frame. Turn buttons $b^3$ serve to removably lock the bail $b$ in engagement with hooks $b^2$. A feed hopper $b^4$ is pivoted on a standard $b^5$ in an inclined position with its lower end resting on frame B as shown. The hopper $b^4$ is narrow at its upper portion and broadens out toward its lower portion where a wall $b^5$ is provided for the retention of ore. Near the bottom of wall $b^5$ are holes $b^6$ which are triangular in shape with the apex pointing downwardly. An adjustable gate $b^7$ serves to open or close the holes $b^6$ as desired. Beyond wall $b^5$ is a barrier $b^8$ over which the material must pass before being delivered to the sieve K. Diverging flanges $b^9$ are provided for distributing material evenly to all the holes $b^6$. Shaft D is mounted upon standards $d$ on tank A and is driven by tight and loose pulleys $d'$. Eccentrics E are carried by shaft D in such position as to receive the eccentric strap $f$ carried by link rods F which are pivotally connected to hangers C. The eccentric straps $f$ are secured to the eccentrics by means of bolts $f'$ taking through lugs $f^2$. In order to prevent undue strain on and the working loose of bolts $f'$, the lugs $f^2$ are arranged to fasten on a plane inclined to the horizontal, so that part of the strain on bolts $f^2$ is converted into a shearing strain instead of a direct pull. The link rods F are in two parts which have their adjoining ends oppositely threaded and engaging a correspondingly threaded turnbuckle $f^3$ by means of which the lengths of link rods F may be adjusted and consequently the level of frame B regulated as desired. At their upper ends hangers C are provided with guide rods G which take through bearings $g$ in standards $g'$ and guide the travel of the hangers in a true vertical direction. One of the hangers C is extended somewhat and provided with bolt holes $c'$ and the corresponding links $c$ have registering bolt holes $c^2$ so that if a true vertical movement of the sieves is desired, the bail $b$ may be disconnected and bolts fastened through holes $c'$ and $c^2$ converting the link $c$ into a rigid connection which prevents swing of the frame B.

The eccentrics E are carried by a housing $e$ to which they are secured by means of bolts $e'$ taking through slots $e^2$ so as to permit a limited movement of the eccentrics with reference to the housing. The housings are secured to shaft D and the eccentrics are slotted to receive wedges $e^3$, carried by a collar $e^4$ which is loosely mounted on shaft D. Cross heads H engage an annular slot in collars $e^4$ and have threaded bearings at each end engaging the threaded shafts I which are mounted in standards $i$. Between standards $i$ are mounted sprocket wheels J which are keyed or otherwise secured to shafts I and held from longitudinal movement by means of sleeves $i'$, located between the hubs of the sprocket wheels and the bearings in standards $i$ on either side. Each pair of sprocket wheels corresponding to each crosshead are connected by a sprocket chain $j$ by means of which each pair of shafts I may be rotated simultaneously to move cross-heads H and force wedges $e^3$ through eccentrics E to adjust the throw of the eccentrics as desired when in operation. It will be observed that while the screw threaded shafts I furnish an ever ready means, for adjusting the eccentrics while in operation, they are self locking against displacement of the eccentrics no matter how heavy the pressure thereon.

The frame B is divided into three compartments, each carrying one of the sieves K, K and $K^2$. The compartment carrying sieve K is somewhat larger than the others and the mesh of sieves K' and $K^2$ are successively finer than those of sieve K and the sieves are located on successively lower levels. Barriers $k$ are placed across the tops of the sieves K, K' and $K^2$ to prevent the too rapid passage of the material thereover and a higher barrier $k'$ is placed at the end of each sieve over which the tailings from each sieve must pass. Sizers L and L' are placed at the end of each of the sieves K and K' in such position as to receive the tailings therefrom. These sizers consist of perforated metal sheets secured at one side to the outside of barrier $k'$ and at the other side to a bar $l$ passed across the top of frame B. They are set on an incline leading to discharge spouts M and M' which pass out through openings in the wall of tank A, into the compartment N where an elevator $n$ operates to remove any material discharged. At one side each of the sieves K, K' and $K^2$ is provided with the usual ore discharge $o$ provided with spout O which leads to compartment P whence the ore may be removed in the usual manner. At its discharge end, sieve $K^2$ is provided with the discharge spout Q which passes through an opening in the wall of the tank A and carries the tailings from sieve $K^2$ to compartment R whence they may be removed as desired. A deflecting board S is placed over the end of the sieve $K^2$, so that any particles settling thereon are directed back on the central portion of the ore bed on sieve $K^2$ whence they pass down into the hutch $a^3$.

In operation the tank and the communicating compartments are filled with standing water and the crushed material containing the ore supplied to hopper $b^4$. Upon rotation of shaft D a vertical motion is communicated to hangers C through eccentrics E. This vertical motion of hangers C tends to produce a corresponding motion of frame B, but the latter being connected to bail $b$, necessarily follows the arc of the circle upon which bail $b$ rotates and consequently is drawn backwardly upon the descent and thrown forward upon the ascent. This is due to the fact that the bail $b$ is in a substantially horizontal position when the frame B begins its downward stroke so that as the bail approaches a vertical position at the completion of the stroke, it necessarily draws the frame backwardly as indicated in dotted lines in Fig. 3. The effect of this combined vertical and horizontal movement is that upon the descent the material on the sieves is momentarily held suspended in the water while the sieves move downwardly and backwardly from under it so that when the material again reaches the sieves, each particle thereof occupies a position a little further forward on the sieves. Then upon the ascent, a forward impetus is given the material so that there is a constant forward movement of the material. As the feed hopper $b^4$ rests on the frame B, these movements of the latter produce corresponding movements of the former so that at each movement of the sieve a quantity of material, depending upon the extent of the movement of frame B, will be thrown over barrier $b^8$ from hopper $b^4$ and fall on sieve K for concentration. Thus it will be seen that the feed from hopper $b^4$ is dependent upon the extent of the movement of frame B and as the passage of the material over the sieves is also dependent upon the movement of frame B, the feed of material will be in proportion to the speed with which it is disposed of on the sieves.

By adjusting the eccentrics E the movement of either end of the sieve may be regulated as desired and by adjusting the lengths of link rods F the sieves may be inclined so as to facilitate or retard the passage of the material over them. The feed from hopper $b^4$ may also be regulated by the gate $b^7$ so that the feed of material and its passage over the sieves is entirely within the control of the operator. The pockets $a^2$ around the sides of the tank and the divisions $a^6$ under the sieves, so interfere with the movement of the water as to prevent its movement or "wash" from getting in unison with the movement of the frame and producing disturbances in the ore beds on the sieves. The concentrating effect of this movement of frame B is much the same as that of the water pulsations in an ordinary jig tank. The heavier, or pure ore particles settle to the sieves, where they either pass through into the corresponding hopper $a^3$ or form an ore bed and are drawn off through discharge openings O. The lighter and smaller particles, or tailings, pass over the barriers at the end of the sieves and must be further treated for the separation of any ore particles contained therein. The tailings from sieve K pass over its barrier into sizer L which partakes of the movements of frame B at that point. Here the finer particles, which are richer in ore, are separated from the coarser particles which are poor in ore, the finer particles passing through the sizer onto sieve K' while the coarser particles pass out through spout M into compartment N whence they are removed for further treatment or to be thrown away as desired. The material passing through sizer L is subjected to substantially the same treatment on sieve K' as that on sieve K, producing a further separation of the ore from the gangues or tailings, which in turn pass to the sizer L' which has a finer mesh than sizer L. Here the finer particles again pass through the sizer while the coarser particles pass out into compartment N. The finer particles from sizer L' pass onto sieve $K^2$, which has a finer mesh than sieve K', and are concentrated as before. The tailings from sieve $K^2$ are practically free of ore and pass out through spout Q into compartment R to be thrown away or treated further if desired.

The very fine particles of some kinds of ore float upon the top of the water and form what are known as "slimes." In my apparatus these slimes collect on the surface of the water at the end of sieve $K^2$ where they are subjected to the continual agitation of the water. After a time these slimes adhere more closely together and, becoming thoroughly saturated with water, sink to fall on the deflecting board S which deflects them backwardly onto the central portion of sieve $K^2$. They are thus prevented from passing out through spout Q and once on sieve $K^2$ are quickly sucked through and saved.

It will be observed by that this apparatus I am enabled to operate without a constant flow of water; that as the material passes from one sieve to another it is sized and the treatment of worthless material saved; that the "slimes" are saved and that the feed and speed of treatment of the material is always entirely within the control of the operator.

While I have shown and described the preferred construction for carrying my invention into effect, this is capable of variation without departing from the spirit of the invention. I therefore do not wish to be limited to the exact construction shown in the drawings but

What I claim as new and desire to secure by Letters Patent is:

1. In an ore concentrator, the combination of a tank; a frame movably mounted in the tank; a sieve in the frame; a series of partitions in the tank around the frame adapted to interfere with the movement of water in the tank; and means for imparting a combined vertical and horizontal movement to the frame, substantially as specified.

2. In an ore concentrator, the combination of a tank; a frame movably mounted in said tank; a sieve in the frame; a series of partitions in the tank around the frame, adapted to interfere with the movement of water in the tank; means for moving the frame vertically; and a pivotal connection with one end of the frame adapted to impart a combined vertical and horizontal movement, substantially as specified.

3. In an ore concentrator, the combination of a tank; a frame movably mounted in the tank; two or more sieves, in the frame, of successively finer mesh and located on successively lower levels; ore discharge spouts for the sieves; a perforated sizer set at the discharge end of a coarse sieve at an inclination and adapted to receive the tailings from said sieve; a discharge for the sizer; and means for imparting a combined vertical and horizontal movement to the frame, substantially as specified.

4. In an ore concentrator, the combination of a tank; a frame movably mounted in the tank; two or more sieves, in the frame, of successively finer mesh and located on successively lower levels; ore discharge spouts for the sieves; a perforated sizer set at the discharge end of a coarse sieve at an inclination and adapted to receive the tailings from said sieve; a discharge for the sizer; means for moving the frame vertically; and a connection pivoted to the tank and removably connected with one end of the frame, substantially as specified.

5. In an ore concentrator, the combination of a tank; a frame movably mounted in the tank; two or more sieves in the frame of successively finer mesh and located on successively lower levels; a series of partitions in the tank around the frame adapted to interfere with the movement of water in the tank; ore discharges for the sieves; a sizer adapted to receive the tailings from a coarser sieve, deposit the finer particles on a finer sieve and discharge the coarser particles; and means for imparting a combined vertical and horizontal movement to the frame, substantially as specified.

6. In an ore concentrator, the combination of a tank; a frame movably mounted in the tank; two or more sieves in the frame of successively finer mesh and located on successively lower levels; a series of partitions in the tank around the frame adapted to interfere with the movement of water in the tank; ore discharges for the sieves; a sizer adapted to receive the tailings from a coarser sieve, deposit the finer particles on a finer sieve and discharge the coarser particles; means for moving the frame vertically and a pivotal connection with one end of the frame adapted to impart a combined vertical and horizontal movement thereto, substantially as specified.

7. In an ore concentrator, the combination of a tank; a frame movably mounted in the tank; a sieve in the frame; a series of partitions in the tank adapted to interfere with the movement of water in the tank; and means for reciprocating the frame, substantially as specified.

8. In an ore concentrator, the combination of a tank; a frame movably mounted in the tank; hangers connected with the frame; a shaft; eccentrics on the shaft having link connections with the hangers; wedges for adjusting the eccentrics; cross heads having rotatable connections with the wedges; screw threaded shafts, on opposite sides of the shaft carrying the eccentrics, having rotatable connections with the cross heads; sprocket wheels on the screw threaded shafts; and a sprocket chain connecting the sprocket wheels, substantially as specified.

9. In an ore concentrator, the combination of a tank; a frame movably mounted in the tank; a series of partitions in the tank around the frame, adapted to interfere with the movement of the water in the tank; a series of concentrating sieves in the frame; an operative shaft above the frame; eccentrics on the shaft each having a connection with an opposite end of the frame; and means for adjusting the throw of the eccentrics independently of each other, substantially as specified.

10. In an ore concentrator, the combination of a tank; a frame movably mounted in the tank; a series of partitions in the tank around the frame, adapted to interfere with the movement of the water in the tank; a series of concentrating sieves in the frame; an operative shaft above the frame; two eccentrics on the shaft each having a connection with an opposite end of the frame; means for adjusting the level of the frame; and means for adjusting the throw of the eccentrics independently of each other, substantially as specified.

11. In an ore concentrator, the combination of a tank; a frame movably mounted in the tank; two or more sieves in the frame of successively finer mesh and located on successively lower levels; a series of partitions in the tank around the frame, adapted to interfere with the movement of water in the tank; ore discharges for the sieves; a sizer adapted to receive the tailings from a coarser sieve and discharge the coarser particles; means for imparting a combined vertical and horizontal movement to the frame; and a feed hopper connected with the frame so that agitation of the frame causes agitation of the hopper and discharges the contents of the hopper onto the sieve, substantially as specified.

12. In an ore concentrator, the combination of a tank; a concentrating frame movably mounted in the tank; means for imparting a combined vertical and horizontal movement to the frame; and a deflecting board inclined across the discharge end of the frame, and arranged to return ore particles to the center of the screen, substantially as specified.

13. In an ore concentrator, the combination of a tank; a frame movably mounted in the tank; vertically reciprocating hangers having a swing connection with the opposite ends of the frame; an operative shaft; adjustable eccentrics on the shaft having adjustable link connections with the hangers; wedges for adjusting the eccentrics; cross heads having rotatable connections with the wedges; screw threaded shafts on opposite sides of the eccentric's shaft, having rotatable connections with the cross heads; sprocket wheels on the screw threaded shafts; sprocket chains connecting the sprocket wheels; sieves, in the frame, of successively finer mesh and located on successively lower levels; ore discharges for the sieves; a perforated sizer set across the discharge end of the coarser sieves at an inclination and adapted to receive the tailings therefrom; a discharge for the sizers; and a deflecting board inclined across the discharge end of the last sieve, substantially as specified.

GEO. T. COOLEY.

Witnesses:
G. B. YOUNG,
G. McCLURE.